(12) United States Patent
Aschenbrenner

(10) Patent No.: US 6,628,840 B1
(45) Date of Patent: Sep. 30, 2003

(54) BOUNDARY MAPPING FOR MULTI-PEL THICKNESS LINES

(75) Inventor: Jean Margaret Aschenbrenner, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/571,448

(22) Filed: May 16, 2000

(51) Int. Cl.$^7$ ................................................. G06K 9/44
(52) U.S. Cl. ........................ 382/256; 382/258; 382/266; 345/443
(58) Field of Search ................................. 382/199, 256, 382/258, 266, 267, 269; 345/619, 643, 442, 443, 469.1, 470; 358/327

(56) References Cited

U.S. PATENT DOCUMENTS

| | | | |
|---|---|---|---|
| 4,849,910 A | * 7/1989 | Jacobs et al. | 345/442 |
| 4,905,166 A | 2/1990 | Schuerman | 345/443 |
| 5,293,472 A | 3/1994 | Lotspiech | 345/443 |

FOREIGN PATENT DOCUMENTS

JP  405258068 A  * 10/1993 ........... G06F/15/72

OTHER PUBLICATIONS

"Breshenham's Algorithm." Kenneth I. Joy, Visualization and Graphics Research Group, Department of Computer Science, University of California, Davis, pp. 1–15.

* cited by examiner

*Primary Examiner*—Andrew W. Johns
*Assistant Examiner*—Shervin Nakhjavan
(74) *Attorney, Agent, or Firm*—Scott W Reid; Bracewell & Patterson, LLP

(57) ABSTRACT

A method for mapping a boundary for a multi-pel thickness line into a bitmap image which describes the pel boundary with respect to an orthogonal pel array. The line has thickness T centered around a spine between a start and stop point. The boundaries for the rounded ends of the line are determined by centering a pre-stored T-diameter pel dot boundary with respect to the start and stop points. The rounded end boundaries are tangentially connected by a first pair of sides of a rectangular perimeter whose remaining two sides diametrically intersect the dot boundaries. The start point, the thickness, and line slope are utilized for estimating and mapping four corner points of the rectangular perimeter with respect to the orthogonal pel array. The vertical orientation of the mapped corner points designate up to five sections of the line boundary including two end sections, one of which lies above an uppermost corner point, and the other below a lowermost corner point. Both end sections are mapped according to the corresponding pel dot boundary as centered at the start and stop points. A middle section has a first straight sliding edged determined according to Bresenham's algorithm and a second straight edge determined by adding the fixed horizontal width of the line to te horizontal position of the first edge. For each of the remaining two sections, one edge is estimated and mapped utilizing Bresenham's algorithm and the other edge is mapped in according to the corresponding 23 Claims, 3 Drawing Sheets

BOUNDARY MAPPING FOR MULTI-PEL THICKNESS LINES

BACKGROUND OF THE INVENTION

1. Technical Field

The present invention relates in general to computer generated graphic images and in particular to a method. for producing a straight line with rounded ends in a data processing environment. More particularly, the present invention relates to an improved method for generating a rasterized image of a straight line.

2. Description of the Related Art

A display or printer is called a "raster" if it produces a graphical image within the context of an orthogonal grid of individual picture elements (pels). When a conventional raster device displays or prints graphic images such as lines, circles, ellipses, and other curves, it does so by coloring those pels in the raster grid that lie closest to the grid location of the line or curve. Until recently, most raster devices have drawn lines that were at most a few pels thick. Currently, higher resolution raster devices are capable of generating lines and curves of arbitrary user specified thickness.

A common method for generating a line having a multi-pel thickness is to draw an initial trace of the line having a thickness of a single pel. A succession of retraces are then drawn with each subsequent retrace slightly displaced from the preceding trace. This method of generating a rasterized line requires substantial processing overhead when the required thickness is more than a few pels thick and is therefore inefficient for higher resolution displays and printers.

Another method for generating multi-pel thickness lines requires the determination of two or more curves that envelope the proposed line and then filling the space within the resulting closed curve. Efficient bound-and-fill methods for filling within a bounded curve are well known in the art. A problem encountered with conventional boundary-and-fill methods is that generating multiple boundary segments is computation intensive and requires substantial processing overhead.

U.S. Pat. No. 5,293,472 describes an alternate method for rasterizing a multi-pel line. This method entails generating a spine list that comprises a digitization of a spine that can be swept by a series of circular dots having pre-determined pen thickness (thickness of the line in pels). A line adjustment algorithm is then utilized to guide the drawing of many overlapping dots to produce the line. This overlapping dot technique requires mapping the same pels into memory many different times. Given the increased resolution of modern printers and display devices and the increased memory required for each pel, the overlapping dot technique results in decreased raster device performance.

It can therefore be appreciated that a need exists for an improved method and system for rasterizing a multi-pel thickness line to suit higher resolution and higher performance graphic display devices.

SUMMARY OF THE INVENTION

A method for mapping a picture element (pel) boundary for a multi-pel thickness line into a bitmap image is disclosed herein. The line has thickness T centered around a spine having a slope, m, between a start and stop point. The boundaries for the rounded ends of the line are determined by centering a pre-stored T-diameter pel dot boundary with respect to the start and stop points. The rounded end boundaries are tangentially connected by a first pair of sides of a rectangular perimeter whose remaining two sides diametrically intersect the dot boundaries. The start (or stop) point, the line thickness, T, and the slope of the line, m are utilized in estimating and mapping four corner points of the rectangular perimeter with respect to the orthogonal pel array. The vertical orientation of the mapped corner points designate up to five sections of the line boundary including two end sections, one of which lies above an uppermost corner point, and the other below a lowermost corner point. Both end sections are mapped according to the corresponding pel dot boundary as centered at the start and stop points. A middle section, situated between the innermost corner points of the rectangular perimeter, has a first straight sliding edged determined according to Bresenham's algorithm and a second straight edge determined by adding the fixed horizontal width of the line to te horizontal position of the first edge. For the remaining two sections, which lie between the middle section and the uppermost and lowermost sections respectively, one edge is estimated and mapped utilizing Bresenham's algorithm and the other edge is mapped in according to the corresponding pel dot boundaries.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

This invention is described in a preferred embodiment in the following description with reference to the figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the present invention. For example, the present invention may be implemented utilizing any combination of computer programming software, firmware, or hardware.

As a preparatory step to practicing the invention or constructing an apparatus according to the invention, the computer programming code (whether software or firmware) according to the invention will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is utilized by either executing the code directly from the storage device, by copying the code from the storage device into another storage device such as a RAM, etc. or by transmitting the code on a network for remote execution. The method form of the invention may be practiced by combining one or more machine readable storage devices containing the code according to the present invention with appropriate standard computer hardware to execute the code contained therein. An apparatus for practicing the invention could be one or more computers and storage systems containing or having network access to computer programs coded in accordance with the invention.

Figure 1:
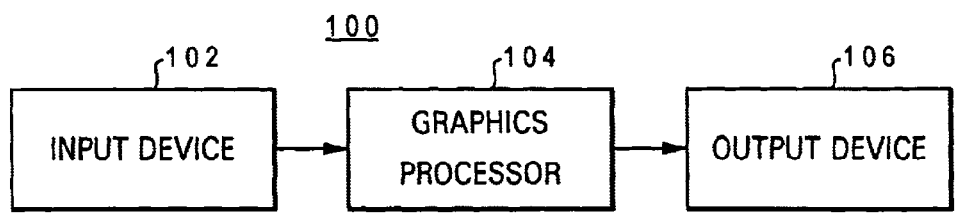
FIG. 1 is a block diagram illustrating a rasterizing system in which a method and system of the present invention may be advantageously utilized.

Referring now to the figures, and in particular with reference to FIG. 1, there is depicted an illustrative embodiment of a rasterizing system 100 in which the present invention may be implemented. As shown in FIG. 1, rasterizing system 100 includes an input device 102 for receiving, translating, and delivering display commands. Rasterizing system 100 further includes a graphics processor 104 in communication with input device 102.

Input device 102, which may include a microprocessor having the ability to execute drawing applications in response to user input, receives input parameters and commands for drawing a line. The method of the present invention may be incorporated in a drawing program executed by graphics processor 104 in response to user-specified parameter values received by input device 102.

In response to receiving a "draw line" command from input device 102, graphics processor 104 performs steps described in further detail with reference to FIGS. 2 and 3 to produce the line as specified by input parameters such as length, thickness, direction, color, etc. as received and interpreted by input device 102. An output display device 106 receives the resulting bitmap file from graphics processor 104 and displays the results thereof on a visual raster medium such as a printed page or an electronic visual display such as a cathode ray tube (CRT) or liquid crystal display (LCD).

Figure 2:
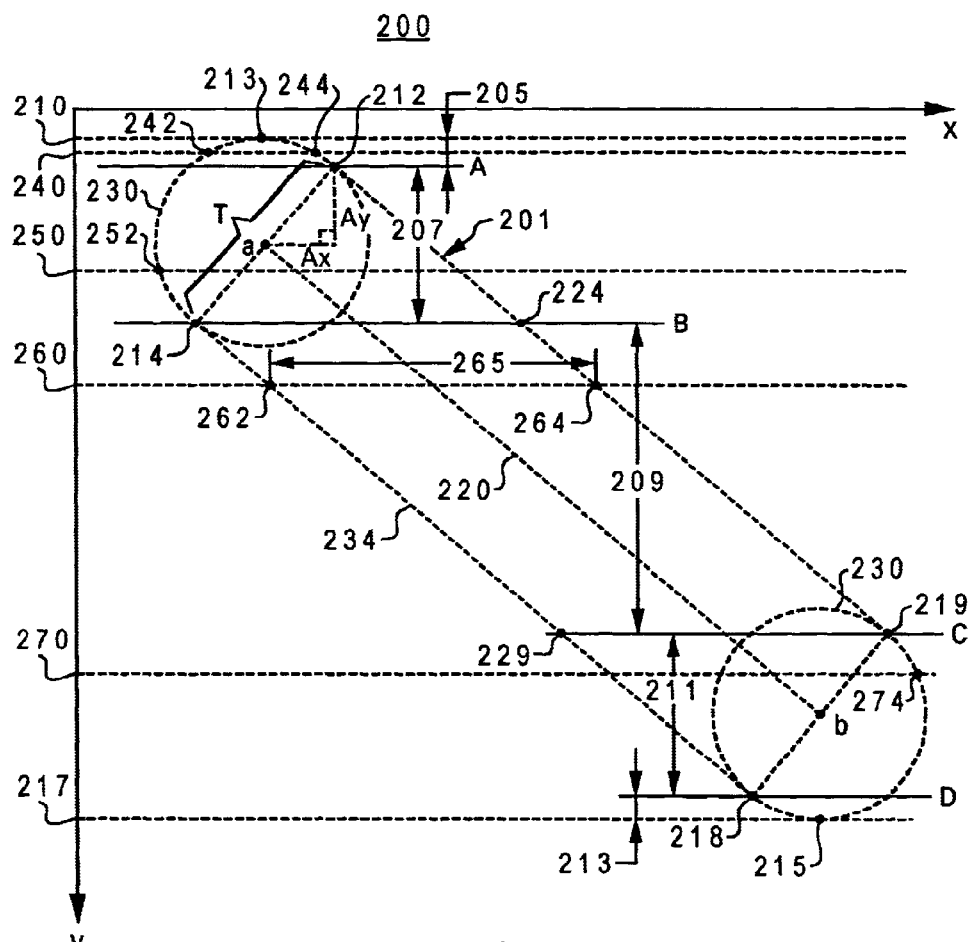
FIG. 2 is a pictorial representation of a bounded straight line generated in accordance with a preferred embodiment of the present invention.

Turning now to FIG. 2 there is illustrated a pictorial representation of a rasterized line boundary 201 that is mapped in accordance with a preferred embodiment of the present invention. As utilized herein, "bitmap" refers to a data structure in memory that represents graphical information in the form of multiple bits, wherein one or more bits represent a single pel in a graphic output display such as a printed page or electronic display screen.

FIG. 2 illustrates the mapping (rasterization) of line boundary 201 within a two-dimensional (x-y) raster display 200. Mapping line boundary 201 entails designating one or more pels that will serve as horizontal (left and right) boundaries on each horizontal scanline between scanlines 210 and 217. It should be noted that although FIG. 2 illustrates line boundary 201 "after the fact," the following description of FIG. 2, and that associated with FIG. 3, are aimed at explaining a particularly advantageous method by which line boundary 201 is mapped into a bitmap image. The bitmapping technique described-herein thus refers to the methodology of determining, within a memory device such as a random access memory or a buffer, the boundary of a straight line having rounded ends as a sequence of bits corresponding to activated pels.

The present invention is particularly advantageous when applied within graphical display devices that generate, store, and output image in a line-by-line rasterizing scheme (i.e., the image is processed within the context of a sequence of horizontal "scan lines", or "rows" in which bits that are associated with image pels are set in each horizontal row, such that the image is stored and processed row-wise as a serial bitstream in memory). The following description is premised on such a rasterizing system.

As shown in FIG. 2, pel boundary 201 is rounded at both ends. Centered within these rounded ends are a start point a and a stop point b that connect a spine 220 over which pel boundary 201 is centered. The orientation of start point a and stop point b, as well as any other point within raster display 200 may be described in terms of x-y coordinates, such as $(a_x, a_y)$ for designating starting point a. Conventional techniques for generating such rounded line ends include utilization of the well-known Bresenham algorithm to determine which pels should be selected to comprise a circular trace. Such a method is described in U.S. Pat. No. 4,905,166 ("METHOD OF GENERATING LINE PARTS", issued to Schuerman on Feb. 27, 1990), which is incorporated herein by reference. As will be explained in further detail below, the present invention simplifies the process by which the boundary for rounded line ends are mapped.

As shown in the depicted embodiment, an uppermost vertical boundary, coinciding with scanline 210, and a lowermost vertical boundary coinciding with scanline 217, are set equal to the vertical (y-axis) orientation of a pair of outermost boundary pels 213 and 215. These outermost vertical boundary pels are determined by centering a pre-stored dot boundary image 230 with respect to start point a and stop point b, wherein pre-stored dot boundary image 230 has a diameter equal to the line thickness, T, of the line bounded by line boundary 201.

Between uppermost boundary scanline 210 and lowermost boundary scanline 217, four other vertical boundaries, coinciding with scanlines A, B, C, and D, are designated in accordance with the depicted embodiment. As illustrated in FIG. 2, each of vertical boundaries A, B, C, and D, coincide with the y-axis values of corner points of a rectangular boundary 234 that tangentially connects the rounded ends at pels 212, 219, 218, and 214.

In a preferred embodiment of the present invention, scanline boundary A is determined as follows. Start point a and stop point b and line thickness T are given in terms of their respective (x,y) positions within raster display 200. The slope, m, of spine 220 may thus be calculated between start point a and stop point b.

From the known location $(a_x, a_y)$ of start point a, line thickness T, and slope m, the y-axis location of scanline A may be determined by first computing an approximate location of the uppermost corner pel 212 of rectangular boundary 234. This computation may be performed utilizing well-known Pythagorean Theorem techniques. As depicted in FIG. 2, corner pel 212 coincides with a vertex of a right triangle having a vertical edge of length $\Delta y$, a horizontal edge of length $\Delta x$, and a hypotenuse of T/2. The non-rasterized vertical distance $\Delta y$ from a may be determined in accordance with the relation:

$$[\Delta y/(T/2)] = \{|a_x - b_x|/\text{sqrt}[(|a_x - b_x|^2) + (|a_y - b_y|^2)]\},$$

wherein $\Delta x$ may be determined in accordance with the relation:

$$[\Delta x/(T/2)] = \{|a_y - b_y|/\text{sqrt}[|a_x - b_x|^2 + |a_y - b_y|^2]\}.$$

Pel 212 is that pel that is located within dot boundary 230 and lies closest to the uppermost corner point of rectangular boundary 234. Vertical boundary A is then set equal to the scanline position in which pel 212 resides. Scanline boundaries B, C, and D are determined similarly by first computing the location of the remaining corner points of rectangular boundary 234 and selecting pels 214, 219, and 218 that lie in closest proximity to the calculated vertex points and which are included within the dot boundary arrays 230.

Figure 3A:
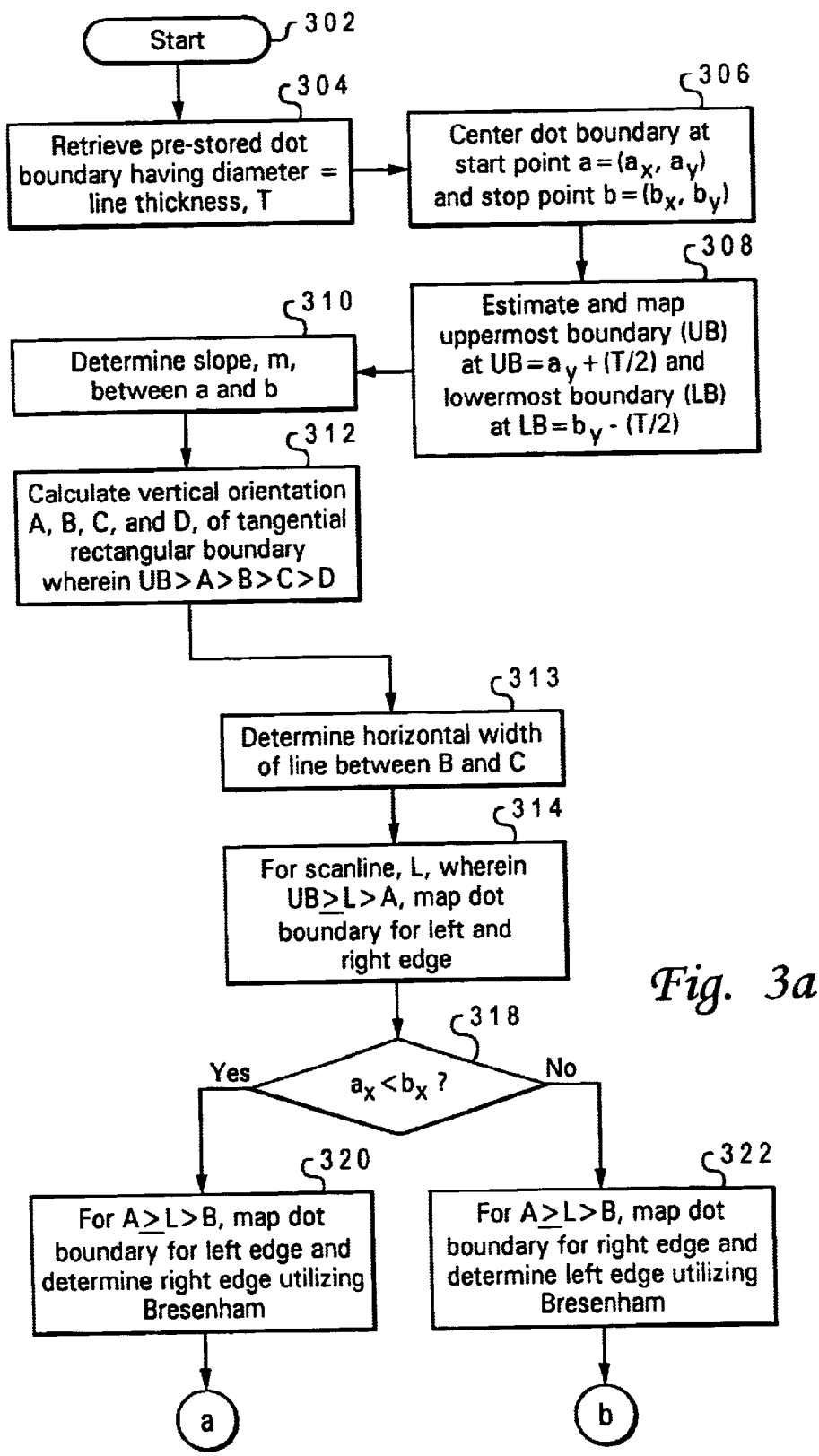
FIG. 3a is a logic flow diagram depicting steps for generating a straight line in a raster device in accordance with a preferred embodiment of the present invention.
Figure 3B:
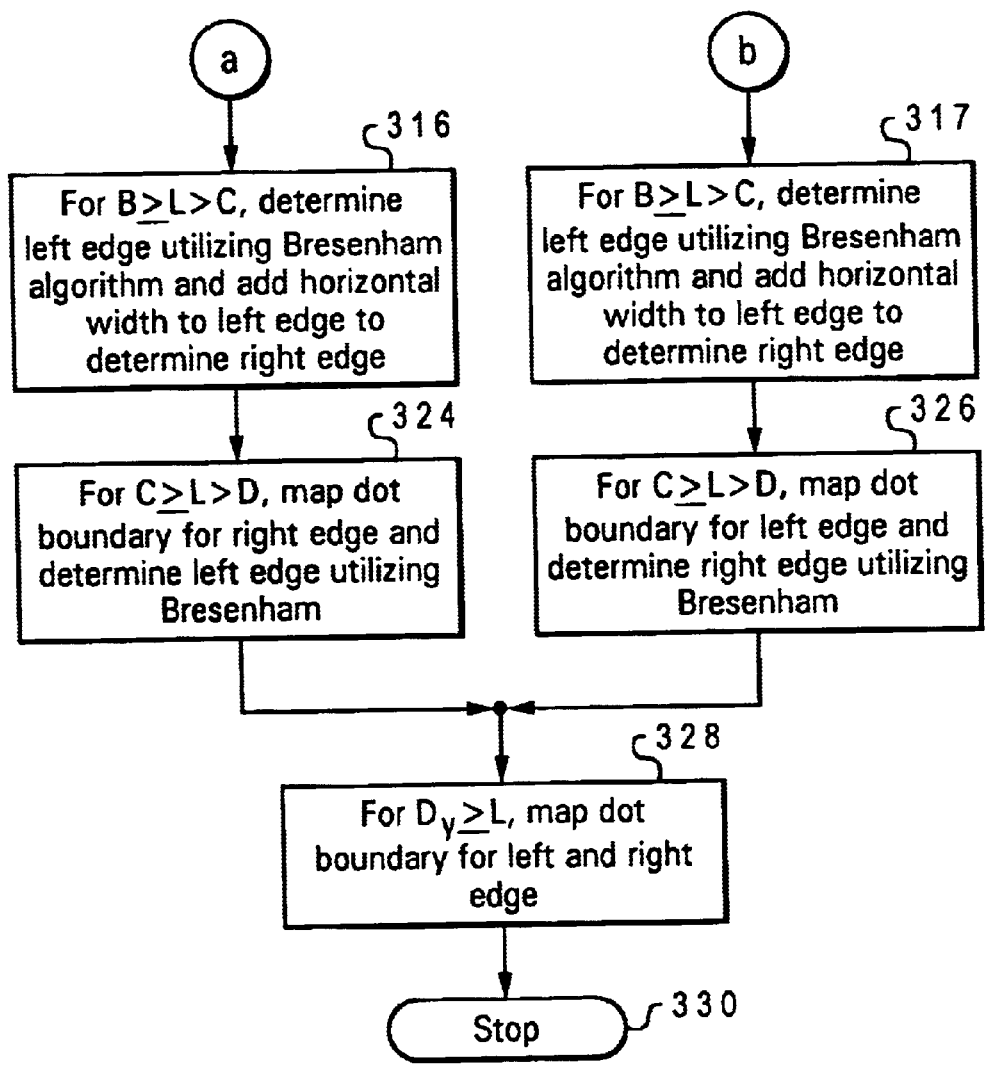
FIG. 3b is a logic flow diagram depicting steps for generating a straight line in a raster device in accordance with a preferred embodiment of the present invention.

With reference now to FIG. 3, a logic flow diagram depicts steps for generating line boundary 201 utilizing graphics processor 104. As shown in FIG. 3, the line generating method begins at step 302 at which preliminary line parameters including start point a, stop point b, and line thickness T are provided to graphics processor 104. Steps 304 and 306 then illustrate an efficient technique for mapping the rounded boundary ends of line boundary 201. Pre-stored dot boundary 230, having a pel diameter equal to T, is retrieved from memory (step 304) and centered with respect to the line start point, a, and stop point, b, (step 306). This orientation of pre-stored dot boundary 230 enables graphics processor 104 to estimate and map an upper and lower scanline boundary as shown at step 308.

Proceeding to step 310, the slope of the line is determined and is subsequently utilized, as depicted at step 312, for determining scanlines A, B, C, and D, which correspond to the corner points of rectangular boundary 234. In an important feature of the present invention, scanlines A, B, C, and D, serve as boundary mapping parameters which, together with upper boundary scanline 210 and lower boundary scanline 217, divide line boundary 201 into five distinct sections, 205, 207, 209, 211, and 213. Referring back to FIG. 2, it should be noted that these five sections each fall into one of three categories. The first category includes line sections that are exclusively rounded as exemplified by sections 205 and 213. The second category are those sections having one rounded edge and one straight (sliding) edge as exemplified by sections 207 and 211. Finally, section 209 exemplifies the third category which is characterized by two straight edges.

Turning back to FIG. 3, after the corner pels 212, 214, 219, and 218 have been determined, the mapping process for the first line boundary category commences as depicted at step 314 for scan lines between and including scanlines 210 and A. A scanline 240 within section 205 includes a left boundary pel 242 and a right boundary pel 244 that are taken directly from pre-stored dot boundary 230. Step 328 depicts an identical technique for mapping boundary points within section 213.

Mapping the boundary pels for sections 207 and 211, each of which fall into the second category (one rounded edge and one straight edge), proceeds as shown at inquiry step 318. Due to the disparity between the left and right edge of each of sections 207 and 211, addition knowledge regarding the orientation of line boundary 201 is required. In particular, upon reaching scanline A, and as depicted at inquiry step 318, the method for mapping the left and right edges of line boundary 201 within sections 207 and 211 is determined according to the direction in which the line "slides." Since line boundary 201 slides to the right ($a_x < b_x$) the boundary mapping for line boundary 201 continues as shown at steps 320, 316, and 324 with the left edge of section 207 and the right edge of section 211 determined in accordance with pre-stored dot boundary 230. As depicted at steps 320 and 324, the left edge of line boundary 201 within section 207 and the right edge of line boundary 201 within section 211 are obtained by mapping the pels within the corresponding dot boundary array 230 as centered at start point a and stop point b. Pel 252 of scanline 250 and pel 274 of scanline 270 are representative of boundary points so obtained.

As further illustrated at steps 320 and 324, the right edge of section 207 and left edge of section 211 are estimated utilizing a straight line estimation technique. In a preferred embodiment of the present invention, Bresenham's algorithm is utilized for determining pels to be mapped within the straight line boundaries of sections 207 and 211 having pels 212 and 224, and pels 229 and 218 as endpoints. Bresenham's algorithm is a well-known line drawing algorithm utilized in a variety of computer graphics applications. From a given starting point, such as pel 212, and a given ending point, such as pel 224, Brehenham's algorithm is utilized to make an incremental (pel-by-pel) determination of which pel along the line connecting the endpoints to activate. In addition to the description provided by Schuerman in U.S. Pat. No. 4,905,166, a generalized explanation of how Brehensam's algorithm may be utilized to determine a rasterized single-pel line mapping is provided in *Bresenham's Algorithm*, by Kenneth I. Joy which is also incorporated herein by reference.

Step 322 and 326 correspond to steps 320 and 324 respectively for cases in which the line boundary slides down and to the left rather than to the right. In such cases, the left edge bounded by scanlines A and B and the right edge bounded by scanlines C and D are straight sliding edges and are determined in accordance with Bresenham's algorithm.

Step 316 illustrates mapping of the left and right edges of section 209, which is defined as falling within the above-mentioned third category. As seen in FIG. 2, the line boundary section 209 is-characterized by straight edges segments having as endpoints pels 214 and 229, and pels 224 and 219. In order to improve efficiency, the preferred embodiment depicted in FIG. 3 performs only one Bresenham computation for section 209. Assuming a left-to-right scanline rasterizing scheme, the left edge boundary pel for each scanline is determined in accordance with Bresenham's algorithm utilizing endpoint pels 214 and 229. After determining a left edge pel such as pel 262, the corresponding right edge pel is determined by adding the horizontal width 265 to the x-value of pel 262 to obtain right boundary pel 264.

Step 313 shows computation of the horizontal width 265 of the line which is needed at steps 316 and 317 to determine the pel location on each scan line for the right edge for scan lines between B and C. In the depicted embodiment, the horizontal width, H 265, is estimated according to the following relation:

$$H|T = \sqrt{(a_{x-b_x})^2 + (a_{y-b_y})^2}/|(a_y - b_y)|.$$

Preferred implementations of the invention include implementations as a computer system programmed to execute the method or methods described herein, and as a program product. According to the computer system implementation, sets of instructions for executing the method and system of the present invention are resident in a storage device such as the ROM or RAM of one or more computer systems. Until required by the computer system, the set of instructions may be stored as a computer-program product in another computer memory, for example, in a disk drive (which may include a removable memory such as an optical disk or floppy disk for eventual utilization in disk drive).

The computer-program product can also be stored at another computer and transmitted when desired to the user's workstation by a network or by an external communications network. One skilled in the art can appreciate that the physical storage of the sets of instructions physically changes the medium upon which it is stored so that the medium carries computer-readable information. The change may be electrical, magnetic, chemical, or some other physical change. While it is convenient to describe the invention in terms of instructions, symbols, characters, or the like, the reader should remember that all of these and similar terms should be associated with the appropriate physical elements. Thus, a method for implementing the steps described in association with FIGS. 2 and 3 can be accomplished with a computer-aided device. In such a method, data stored in a memory unit of a data-processing system such as a data-processing system, can represent steps in a method for implementing a preferred embodiment of the present invention.

While the invention has been particularly shown and described with reference to a preferred embodiment, it will be understood by those skilled in the art that various changes in form and detail may be made therein without departing from the spirit and scope of the invention.

What is claimed is:

1. A method for mapping a picture element (pel) boundary for a straight line into a bitmap image that describes said pel boundary with respect to an orthogonal pel array, wherein said straight line has rounded ends and a multi-pel thickness T, said method comprising the steps of:

determining rounded end boundaries for said straight line by centering a pre-stored dot boundary of diameter T with respect to a start point and a stop point;

estimating a rectangular boundary having a first pair of side that tangentially intersect said rounded end boundaries of said line and a second pair of sides that diametrically intersect said rounded end boundaries of said line; and mapping said pel boundary as encompassing an outer perimeter of non-intersecting portions of said rounded end boundaries and a rectangle formed within said rectangular boundary.

2. The method of claim 1, wherein the location of a pel within said orthogonal pel array is determined in terms of an x-y horizontal-vertical coordinate system, and wherein said estimating step further comprises the steps of:

determining an x-y coordinate $(a_x, a_y)$ of said start point;

determining an x-y coordinate $(b_x, b_y)$ of said stop point;

determining m in accordance with the relation:

$$m = dy/dx,$$

wherein dy represents the vertical distance $|a_y - b_y|$ and dx represents the horizontal distance $|a_x - b_x|$; and estimating a bitmap location of a corner point of said rectangular boundary with respect to said start point according to m and T.

3. The method of claim 2, wherein said step of estimating a bitmap location of a corner point of said rectangular boundary further comprises the step of determining a vertical edge $\Delta y$ of a right triangle having a horizontal edge of length $\Delta x$, and a hypotenuse of T/2, wherein said hypotenuse has one endpoint at $(a_x, a_y)$ and another endpoint at said corner point, wherein $\Delta y$ may be determined in accordance with the relation:

$$[\Delta y/(T/2)] = \{|a_x - b_x|/\sqrt{(|a_x - b_x|^2 + |a_y - b_y|^2)}\}$$

and wherein $\Delta x$ may be determined in accordance with the relation:

$$[\Delta x/(T/2)] = \{|a_y - b_y|/\sqrt{(|a_x - b_x|^2 + |a_y - b_y|^2)}\}.$$

4. The method of claim 1, wherein said estimating step further comprises the step of determining four corner points of said rectangular boundary with respect to said start point, said stop point, m, and T.

5. The method of claim 4, wherein said step of mapping said pel boundary further comprises the step of vertically dividing said line boundary into a plurality of sections at each of said four corner points, wherein each section of said line boundary may be categorized as belonging to one of three categories including a first category having two rounded edges, a second category having one rounded edge and one straight edge, and a third category having two straight edges.

6. The method of claim 5, further comprising the steps of:

mapping pel boundary positions within sections belonging to said first category according to said pre-stored dot array;

for sections belonging to said second category:
mapping pel boundary positions according to said pre-stored dot array for said rounded edge; and
mapping pel boundary positions according to a straight line estimation technique for said straight edge; and
mapping pel boundary positions within sections belonging to said third category according to a straight line estimation technique.

7. The method of claim 6, wherein said step of mapping pel boundary positions within sections belonging to said third category according to a straight line estimation technique further comprises the steps of:

mapping pel boundary positions for a first straight edge according to said straight line estimation technique; and mapping pel boundary positions for a second straight edge by adding a horizontal width constant to said first straight edge.

8. A method for mapping a straight line boundary within an orthogonal picture element (pel) array, wherein said orthogonal pel array includes a plurality of vertically descending rows of horizontal scanlines, and wherein said straight line has a multi-pel thickness, T, and a slope, m, between a start point and stop point, said method comprising the steps of:

determining rounded ends of said line boundary by centering a pre-stored dot boundary pel array having diameter T with respect to said start point and said stop point;

mapping four corner points of a rectangular perimeter having a first pair of sides that tangentially connect said rounded ends and a second pair of sides that intersect said start point and said stop point;

vertically dividing said line boundary into a plurality of sections at each of said four corner points, wherein each section of said line boundary may be categorized as belonging to one of three categories including a first category having two rounded edges, a second category having one rounded edge and one straight edge, and a third category having two straight edges; and for sections belonging to said first category, mapping pel positions according to said pre-stored dot array;

for sections belonging to said second category:
mapping pel positions according to said pre-stored dot array for said rounded edge; and
mapping pel positions according to a straight line estimation technique for said straight edge; and
for sections belonging to said third category, mapping pel positions according to a straight line estimation technique.

9. A system for mapping a picture element (pel) boundary for a straight line into a bitmap image that describes said pel boundary with respect to an orthogonal pel array, wherein said straight line has rounded ends and a multi-pel thickness T, said system comprising:

graphics processing means for determining rounded end boundaries for said straight line by centering a pre-stored dot boundary of diameter T with respect to a start point and a stop point;

graphics processing means for estimating a rectangular boundary that includes a first pair of sides that tangentially intersect said rounded end boundaries of said line and a second pair of side that diametrically intersect said rounded end boundaries; and graphics processing means for mapping said pel boundary as encompassing an outer perimeter of non-intersecting portions of said rounded end boundaries and a rectangle formed within said rectangular boundary.

10. The system of claim 9, wherein the location of a pel within said orthogonal pel array is determined in terms of an x-y horizontal-vertical coordinate system, and wherein said graphics processing means for estimating a rectangular boundary further comprises:

graphics processing means for determining an x-y coordinate ($a_a$, $a_y$) of said start point;

graphics processing means for determining an x-y coordinate ($b_x$, $b_y$) of said stop point;

processing means for determining m in accordance with the relation:

$$m = dy/dx,$$

wherein dy represents the vertical distance $|a_y - b_y|$ and dx represents the horizontal distance $|a_x - b_x|$; and graphics processing means for estimating a bitmap location of a corner point of said rectangular boundary with respect to said start point according to m and T.

11. The system of claim 10, wherein said graphics processing means for estimating a bitmap location of a corner point of said rectangular boundary further comprises graphics processing means for determining a vertical edge $\Delta y$ of a right triangle having a horizontal edge of length $\Delta x$, and a hypotenuse of T/2, wherein said hypotenuse has one endpoint at ($a_x$, $a_y$) and another endpoint at said corner point, wherein $\Delta y$ may be determined in accordance with the relation:

$$[\Delta y/(T/2)] = \{|a_x - b_x|/\sqrt{(|a_x - b_x|^2 + |a_y - b_y|^2)}\},$$

and wherein $\Delta x$ may be determined in accordance with the relation:

$$[\Delta x/(T/2)] = \{|a_y - b_y|/\sqrt{(|a_x - b_x|^2 + |a_y - b_y|^2)}\}.$$

12. The system of claim 9, wherein said graphics processing means for estimating a rectangular boundary further comprises graphics processing means for determining four corner points of said rectangular boundary with respect to said start point, said stop point, m, and T.

13. The system of claim 12, wherein said graphics processing means for mapping said pel boundary further comprises graphics processing means for vertically dividing said line boundary into a plurality of sections at each of said four corner points, wherein each section of said line boundary may be categorized as belonging to one of three categories including a first category having two rounded edges, a second category having one rounded edge and one straight edge, and a third category having two straight edges.

14. The system of claim 13, further comprising:

graphics processing means for mapping pel boundary positions for sections belonging to said first category according to said pre-stored dot array;

graphics processing means for mapping pel boundary positions within sections belonging to said second category according to said pre-stored dot array for said rounded edge; and graphics processing means for mapping pel boundary positions within sections belonging to said second category according to a straight line estimation technique for said straight edge; and graphics processing means for mapping pel boundary positions within sections belonging to said third category according to a straight line estimation technique.

15. The system of claim 14, wherein said straight line estimation technique comprises Bresenham's algorithm.

16. The system of claim 14, wherein said graphics processing means for mapping pel boundary positions within sections belonging to said third category according to a straight line estimation technique further comprises:

graphics processing means for mapping pel boundary positions for a first straight edge according to said straight line estimation technique; and graphics processing means for mapping pel boundary positions for a second straight edge by adding a horizontal width constant to said first straight edge.

17. An article of manufacture for mapping a picture element (pel) boundary for a straight line into a bitmap image that describes said pel boundary with respect to an orthogonal pel array, wherein said straight line has rounded ends and a multi-pel thickness T, said article of manufacture comprising computer readable storage media including program logic embedded therein that causes control circuitry to perform the steps of:

determining rounded end boundaries for said straight line by centering a pre-stored dot boundary of diameter T with respect to a start point and a stop point;

estimating a rectangular boundary that includes a first pair of sides that tangentially intersect said rounded end boundaries of said line and a second pair of side that diametrically intersect said rounded end boundaries; and mapping said pel boundary as encompassing an outer perimeter of non-intersecting portions of said rounded end boundaries and a rectangle formed within said rectangular boundary.

18. The article of manufacture of claim 17, wherein the location of a pel within said orthogonal pel array is determined in terms of an x-y horizontal-vertical coordinate system, and wherein said program logic further causes control circuitry to perform the steps of:

determining an x-y coordinate ($a_x$, $a_y$) of said start point;

determining an x-y coordinate ($b_x$, $b_y$) of said stop point;

determining m in accordance with the relation:

$$m = dy/dx,$$

wherein dy represents the vertical distance $|a_y - b_y|$ and dx represents the horizontal distance $|a_x - b_x|$; and estimating a bitmap location of a corner point of said rectangular boundary with respect to said start point according to m and T.

19. The article of manufacture of claim 18, wherein said program logic causing control circuitry to estimate a bitmap location of a corner point of said rectangular boundary further comprises program logic for determining a vertical edge $\Delta y$ of a right triangle having a horizontal edge of length $\Delta x$, and a hypotenuse of T/2, wherein said hypotenuse has one endpoint at $(a_x, a_y)$ and another endpoint at said corner point, wherein $\Delta y$ may be determined in accordance with the relation:

$$[\Delta y/(T/2)]=\{|a_x-b_x|/\sqrt{(|a_{x-b_x}|^2+|a_{y-b_y}|^2)}\},$$

and wherein $\Delta x$ may be determined in accordance with the relation:

$$[\Delta x/(T/2)]=\{|a_y-b_y|/\sqrt{(|a_{x-b_x}|^2+|a_{y-b_y}|^2)}\}.$$

20. The article of manufacture of claim 17, wherein said program logic for estimating a rectangular boundary further comprises program logic for determining four corner points of said rectangular boundary with respect to said start point, said stop point, m, and T.

21. The article of manufacture of claim 20, wherein said program logic for mapping said pel boundary further comprises program logic for vertically dividing said line boundary into a plurality of sections at each of said four corner points, wherein each section of said line boundary may be categorized as belonging to one of three categories including a first category having two rounded edges, a second category having one rounded edge and one straight edge, and a third category having two straight edges.

22. The article of manufacture of claim 21, further comprising program logic that causes control circuitry to perform the steps of:

mapping pel boundary positions for sections belonging to said first category according to said pre-stored dot array;

mapping pel boundary positions within sections belonging to said second category according to said pre-stored dot array for said rounded edge; and mapping pel boundary positions within sections belonging to said second category according to a straight line estimation technique for said straight edge; and mapping pel boundary positions within sections belonging to said third category according to a straight line estimation technique.

23. The article of manufacture of claim 22, wherein said program logic for mapping pel boundary positions within sections belonging to said third category according to a straight line estimation technique further comprises program logic for causing control circuitry to perform the steps of:

mapping pel boundary positions for a first straight edge according to said straight line estimation technique; and mapping pel boundary positions for a second straight edge by adding a horizontal width constant to said first straight edge.

\* \* \* \* \*